Dec. 1, 1970 J. KAUFMANN, JR 3,543,510
EXHAUST CONVERSION SYSTEMS
Filed Aug. 30, 1968 3 Sheets-Sheet 1

INVENTOR.
John Kaufmann Jr.
BY
HIS ATTORNEYS

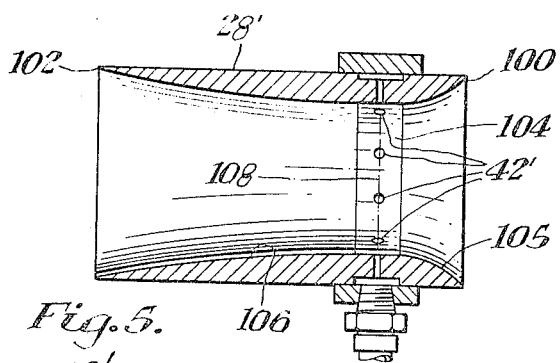
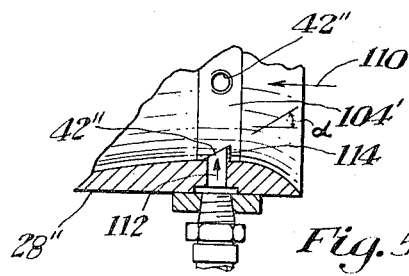
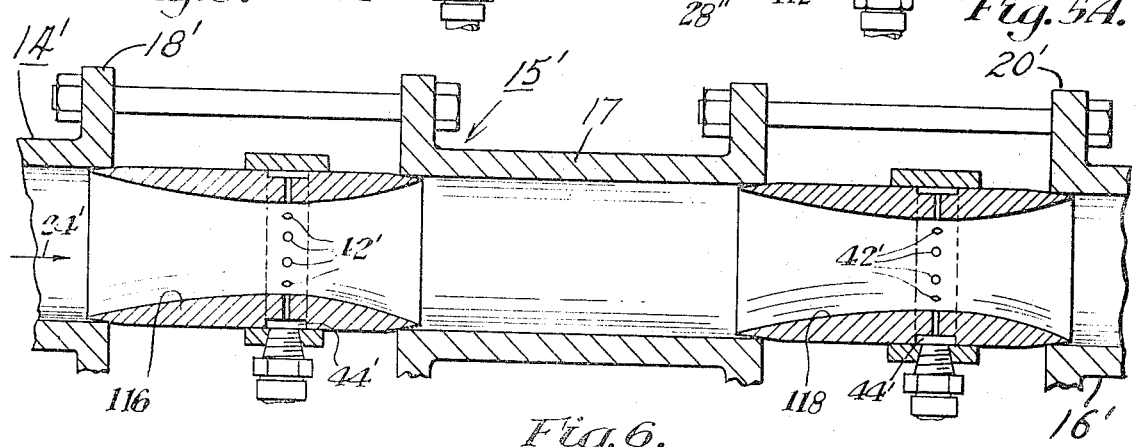
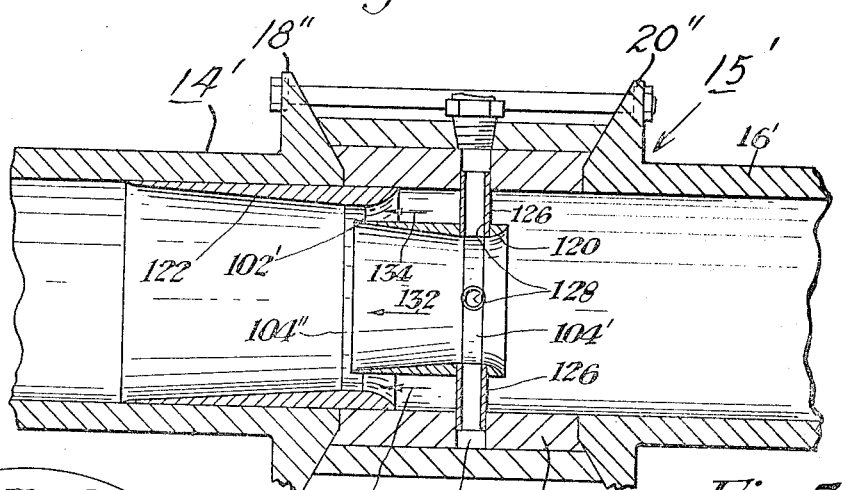
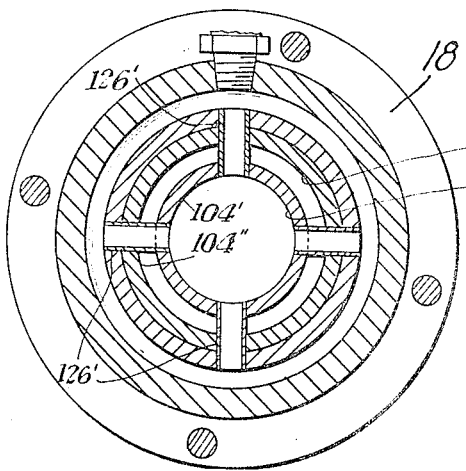

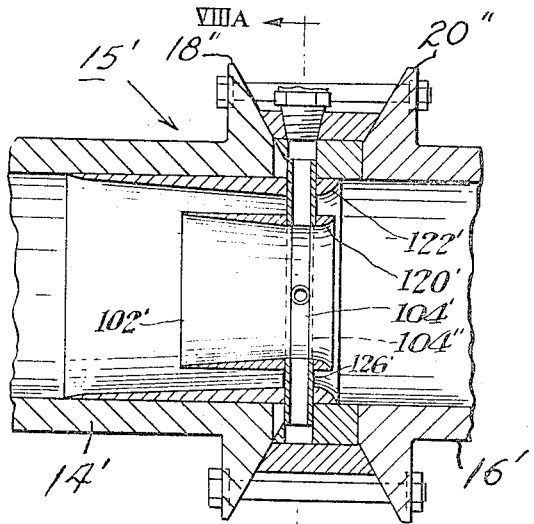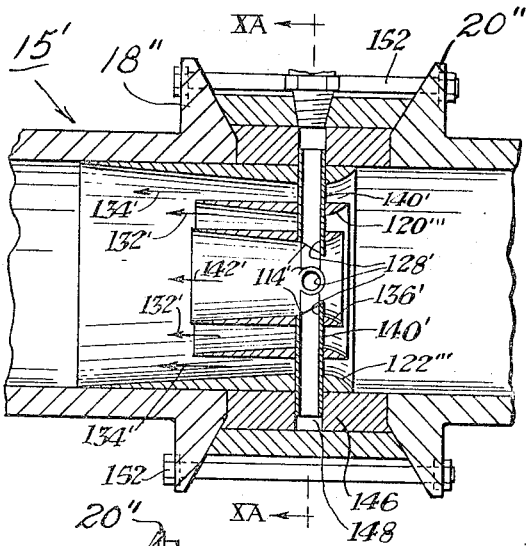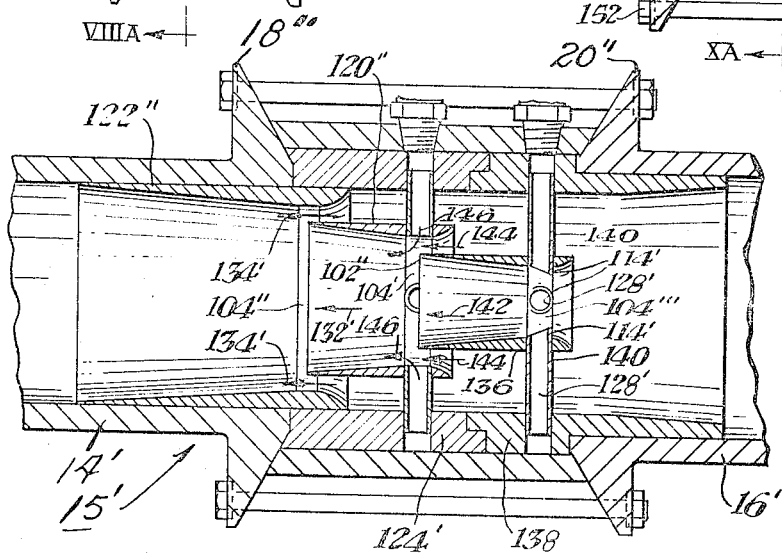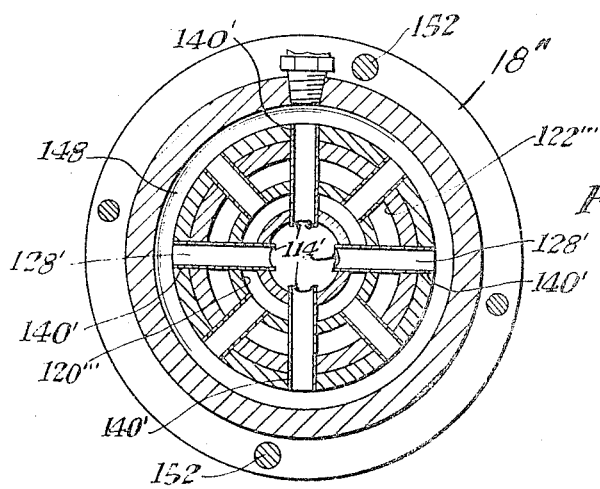

United States Patent Office 3,543,510
Patented Dec. 1, 1970

3,543,510
EXHAUST CONVERSION SYSTEMS
John Kaufmann, Jr., 3716 Woodrow Ave.,
Pittsburgh, Pa. 15227
Continuation-in-part of application Ser. No. 618,226,
Feb. 23, 1967. This application Aug. 30, 1968, Ser.
No. 767,602
Int. Cl. F01n 3/10; F04f 5/16
U.S. Cl. 60—30
16 Claims

ABSTRACT OF THE DISCLOSURE

I disclose a conversion system for the exhaust duct of an internal combustion engine, said system comprising at least one venturi induction section mounted in the exhaust duct, said venturi section being disposed adjacent that portion of said duct wherein said exhaust gases exhibit substantially a maximum temperature and a nonpulsating flow, said venturi section having a circumferential array of radially extending apertures for inducting combustion air into said duct upon the passage of said exhaust gases therethrough.

This application is a continuation-in-part of my copending patented application entitled Anti-Pollution Means For Internal Combustion Engines, filed Feb. 23, 1967, Ser. No. 618,226, now abandoned.

The present invention relates to means for reducing or eliminating altogether the noxious gases emitted from the exhaust systems of combustion operations, in particular internal combustion engines, in order to reduce the air pollution resulting from operation thereof. More particularly, the invention relates to means of the character described for completing the combustion of internal combustion engine exhaust gases, irrespective of engine speed, in order to convert them to innocuous fluids.

Although my invention is described with primary reference to the exhaust system of internal combustion engines, it will become apparent as this description proceeds that the invention is not limited to this application. My exhaust conversion system is of general utility, and can be installed in a variety of exhaust systems handling products of incomplete combustion to oxidize potential air contaminants or in similar systems handling high temperature oxidizable or combustible gases. For example, it is contemplated that my conversion system or anti-pollution means can be installed in the exhausts of various types of reaction motors, industrial furnaces and the like.

It is well known that the various hydrocarbon fuels employed in those engines generally classed as internal combustion engines are not completely combusted therein. This unavoidable, incomplete combustion of the fuels thus employed results in the generation of substantial quantities of unburned or partially burned hydrocarbons, carbon monoxide, and other noxious waste gases which are usually vented to the atmosphere through the exhaust system. It is also well known that these noxious gases constitute a health hazard owing to their pollutional effects in the atmosphere. In recent years the health hazard has grown to dangerous proportions as a result of the rapidly increasing numbers of automobiles and other vehicles powered by internal combustion engines.

Many proposals have been advanced previously for combatting this health menace, most of which have attempted to burn or oxidize the exhaust gases either by thermal or catalytic conversional techniques. In the catalytic method, the exhaust gases leaving the engine are passed through a conversion unit in which the catalyst is suspended. Such units are rather bulky in construction and are therefore difficult to accommodate in most types of vehicles, where space is at a premium. Moreover, it is necessary to provide a carefully balanced supply of oxygen or the like and to maintain a particular heat balance. Catalytic converters therefore are difficult to maintain in proper adjustment even under ideal conditions and are virtually useless in the wide range of driving conditions encountered by the average vehicle.

In many of the thermal converting systems, an additional combustion chamber is required in the exhaust system of the engine. The combustion chamber is equally difficult to accommodate in the vehicle for the same reasons mentioned above in connection with the catalytic chamber. Many of these exhaust combustion chambers are provided in the form of afterburners which require additional fuel and an auxiliary ignition system, in addition to auxiliary combustion air, to accomplish the conversion of the exhaust fumes. The use of secondary fuel, of course, decreases the efficiency of the vehicle considerably, and in the event of failure of the ignition system or other malfunctioning in the afterburner, the noxious fumes from the engine exhaust are greatly increased by addition of the secondary fuel. Moreover, if either the catalytic converter or the thermal converter are placed under the hood of a conventionally constructed automobile, the danger to the vehicle's occupants is considerably increased in the event of malfunctioning of these converters.

It has also been proposed to conduct auxiliary combustion air from a blower or from a source of compressed air directly into the inlet ports of the exhaust manifold of an internal combustion engine. Such an arrangement, as typified by the U.S. patent to Dworak 3,091,078, would utilize the exhaust manifold or manifolds as exhaust combustion chambers. However, as the incoming exhaust streams through each of the exhaust manifold inlet ports is pulsating, as dictated by the engine's operating pattern, it is difficult, if not impossible, to maintain any sort of uniformity and continuity of combustion within the exhaust manifold. Whatever combustion does occur in the exhaust manifold is initiated at points very close to the exhaust valves of the engine with the result that these valves are rapidly burned. The resulting turbulence of these gases which are thus combusted, within the manifold moreover interferes with the proper flow of exhaust gases therethrough. As a result, it has been found necessary to employ some sort of catalytic or thermal conversion unit downstream of the exhaust manifold.

In general, none of the prior proposals for combusting or converting noxious exhaust fumes into innoccuous substances have been successful. In those known systems wherein a substantial conversion has been effected, the physical size of the equipment required to make the conversion has precluded their use with internal combustion engines employed in most automobiles and other vehicles where space is at a premium.

In many of the previously proposed exhaust conversion systems, auxiliary combustion air has been inducted into the exhaust stream by jet aspirators or by improperly shaped and improperly located venturi aspirators or the like. These devices provide an uncertain supply of auxiliary combustion air at best, and under certain conditions for example when the engine is idling or nearly so, the flow through the jet or venturi aspirator is reversed so that noxious exhaust fumes are emitted prematurely from the exhaust system, i.e. at a location where the fumes can enter the cab or passenger compartment of the vehicle resulting in a hazard to the occupants thereof. Examples of such prior proposals are the U.S. patents to Knopp 3,300,964 and Barnes 3,032,969.

My researches in this field indicate that these devices would not function properly at all engine speeds owing to the shapes of their venturi structures and the location of the air intake apertures. As described more fully below, to complete the combustion of the exhaust gases requires a careful addition and distribution of combustion air into the exhaust duct. Under certain conditions, it is necessary to introduce a particular type of glow ignition device to maintain ignition of the exhaust gases.

A crank case scavenging apparatus utilizing the venturi principle is shown in Phillips 2,585,495. The Phillips device would appear to add to atmospheric pollution, as apparently there is no attempt to oxidize the exhaust and crank case gases.

I have solved these difficulties of the prior art by providing a simple yet reliable conversion or anti-pollution system for exhaust gases, which requires little or no additional space for the vehicle exhaust system when my conversion means is mounted in the exhaust duct forming part thereof. My conversion system includes means for inducting auxiliary combustion air directly into the vehicle exhaust system at a point where the heat of the exhaust system is sufficient to initiate and to drive the combustion of the exhaust fumes substantially to completion. I have determined that the most advantageous point of entry for the auxiliray combustion air is adjacent the outlet of the one or more exhaust manifolds employed on the vehicle engine. At this point the exhaust stream is relatively steady, in contrast to the pulsating stream at the exhaust manifold inlet ports. Furthermore, the usual cast iron construction of the exhaust manifold does not permit a significant temperature drop in the hot exhaust gases between the exhaust ports of the individual cylinders and the exhaust manifold outlet. Accordingly, an adequate temperature level is available under all driving conditions of the vehicle to initiate and to sustain the combustion of the exhaust gases in conjunction with the auxiliary combustion air added by my conversion system.

In certain applications, my conversion system also includes means for carefully metering the auxiliary combustion air supplied to the conversion system and for preventing reverse flow from the conversion system for example when the engine is idling.

In order to afford a proper mixture of combustion air with the exhaust gases, in particular at widely variable engine speeds, I have found particular shapes of the venturi structure to be most effective. For example, depending upon the application of the invention, I provide the inner surfaces of the venturi structure with a certain curvature in combination with particular angles of leading and trailing edges. The efficiency of my venturi structure is further enhanced by a particular location of the combustion air entrance apertures relative to the venturi throat and the use of a particular shape of surface surrounding the apertures.

In other applications of my invention, I have found that combustion of the exhaust gases is made even more complete by the use of two or more venturi structures in series, in parallel, or in parallel-series within the exhaust duct. With the use of multiple venturi structures, combustion air can be supplied independently to one or more of the venturi structures. When the venturi structures are arranged in parallel or in series-parallel array, one of the structures can serve as a glow ignition device.

In most applications my conversion system, in addition to requiring little or no additional space for the exhaust system, involve no moving parts with a result that the possibilities of malfunctioning of the system are almost nil. In other forms of my conversion system, those moving parts which are utilized are simple and rugged in construction so that maintenance of the system is minimized and its reliability is enhanced. Finally and most importantly, my novel conversion system requires little or no modification of the exhisting engine exhaust ductwork so that my system can be installed on existing as well as newly manufactured vehicles.

I accomplish these desirable results by providing a conversion system for an exhaust duct of an internal combustion engine or for a similar duct through which partially combusted gases are circulated, said system comprising at least one venturi induction section mounted in the exhaust duct, said venturi section being disposed adjacent that portion of said duct wherein said exhaust gases exhibit substantially a maximum temperature and a nonpulsating flow, said venturi section having a circumferential array of radially extending apertures for inducting air into said duct upon passage of said exhaust gases therethrough.

I also desirably provide a similar conversion system wherein said apertures have a length-to-diameter ratio sufficient to provide a jetting action to combustion air passing therethrough so that thorough mixing of said air and said exhaust gases is attained within said venturi section.

I also desirably provide a similar conversion system wherein said venturi section is coupled between an exhaust port of an exhaust manifold of said engine and an exhaust outlet pipe, said manifold and said pipe forming parts of said exhaust duct.

I also desirably provide a similar conversion system wherein a hood structure at least partially surrounds at least some of said venturi apertures to promote mixing of the exhaust gases with the inducted combustion air.

I also desirably provide a similar conversion system wherein said venturi section is provided with a relatively narrow and substantially flat throat area disposed substantially closer to a leading edge than to a trailing edge of said venturi section, and said apertures are extended through said flat section.

I also desirably provide a similar conversion system wherein a plurality of the venturi sections are mounted in series in said exhaust duct.

I also desirably provide a similar conversion system wherein a plurality of venturi sections are mounted in parallel or in parallel-series within the exhaust duct.

During the foregoing discussion various objects, features and advantages of the invention have been alluded to. These and other objects, features and advantages of the invention together with structural details thereof will be elaborated upon during the forthcoming description of certain presently preferred embodiments of the invention together with presently preferred methods of practicing the same.

In the accompanying drawings I have shown certain presently preferred embodiments of the invention and have illustrated certain presently preferred methods of practicing the same in which:

FIG. 5 is a longitudinally sectioned view of an exemplary venturi construction arranged in accordance with my invention and useful in the embodiments of the invention depicted herein;

FIG. 5A is a partial view similar to FIG. 5 and showing a modified aperture entrance structure;

FIG. 6 is a partial longitudinally sectioned view of still another form of my conversion system wherein a pair of venturi structures are mounted in series within an exhaust duct or the like;

FIG. 7 is a partial longitudinally sectioned view of a series-parallel venturi exhaust conversion system arranged in accordance with my invention;

FIG. 8 is a partial longitudinally sectioned view of a parallel venturi conversion system of my invention;

FIG. 8A is a cross sectional view of the apparatus as shown in FIG. 8;

FIG. 9 is a similar view of another form of my series-parallel conversion system;

FIG. 10 is a similar view showing another form of my parallel venturi conversion system; and FIG. 10A is a cross sectional view of the apparatus as shown in FIG. 10.

Figure 1:
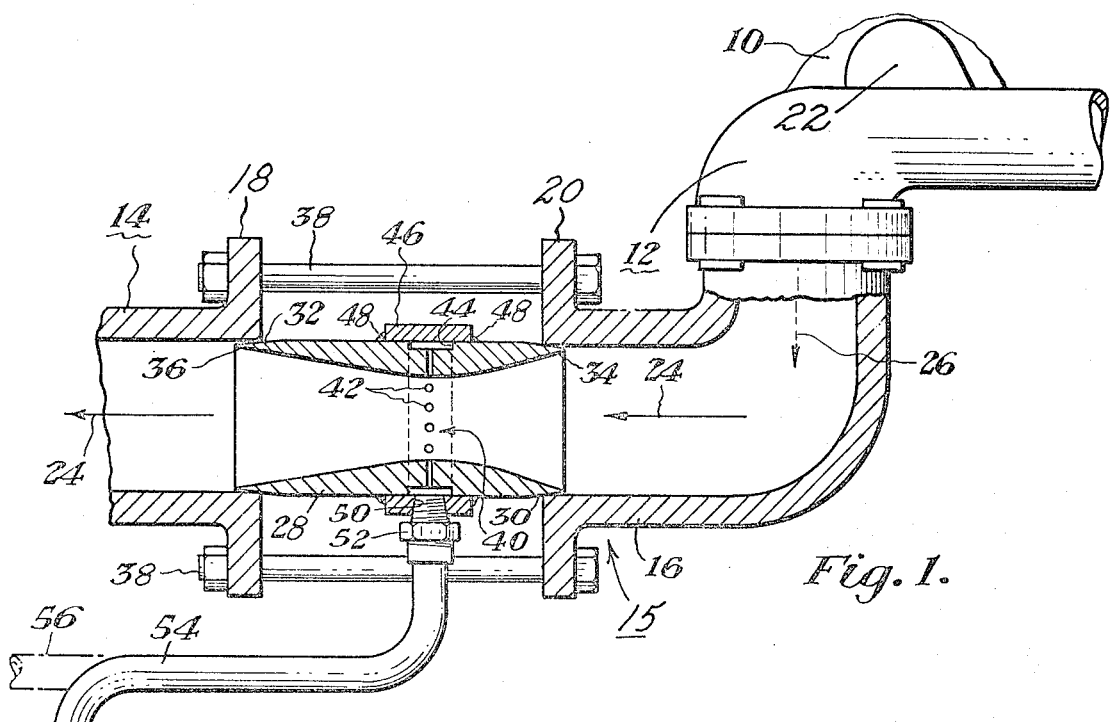
FIG. 1 is an elevational view, partly in section of an internal combustion engine and exhaust system utilizing my novel exhaust conversion or anti-pollutional system.

Referring now more particularly to the figures and initially to FIG. 1 of the drawings, the exemplary form of my exaust conversion system or anti-pollution means shown therein is adapted for use with a conventional gasoline or diesel internal combustion engine 10 or the like, having a conventional exhaust manifold 12 and tailpipe 14, which normally is secured directly to the outlet port 16 of the exhaust manifold 12. The tailpipe 14 and manifold outlet 16 and associated components form an exhaust duct 15. In this arrangement, however, the tailpipe 14 which is provided with a conventional connecting flange 18 is spaced from the exhaust manifold outlet port 16 which is also provided with a conventional connecting flange 20. The exhaust manifold 12 is provided with the usual number of inlet ports 22 whereby the exhaust manifold is joined to the engine block in alignment with the individual cylinder exhaust ports. The direction of flow of exhaust fluids through the exhaust system thus far described is denoted by flow arrows 24.

In the region of the flow arrows 24 the pulsating inlet exhaust streams through the inlet ports 22, designated by dashed outline arrows 26, have been converted into a substantially steady flow of effluents. The usual cast iron structure of exhaust manifold 12 minimizes the temperature drop between the exhaust manifold inlet ports 22 and its outlet port 16. Accordingly, as noted previously, I have determined that the optimum induction point for auxiliary combustion air is adjacent the manifold outlet port 16. A venturi inductor section 28 is inserted between the manifold outlet 16 and the tailpipe 14. In this arrangement of the invention, the venturi section 28 is provided with an outside diameter similar to the inside diameter of the outlet port 16 and tailpipe 14. Specifically, the outside diameter of the venturi section 28 is made slightly larger than the aformentioned inner diameters with the exception of tapered portions 30 and 32 formed on the outer surface of the venturi section 28 at its leading and trailing edges 34, 36. These edges 34, 36 are substantially feathered or tapered to a very thin edge to minimize the fluid resistance of the venturi section 28. The tapered surfaces 30, 32 can be cast integrally with the venturi section 28, or alternatively, the tapered surfaces can be machined thereon with conventional equipment.

The tapered surfaces 30, 32 are preferably shaped so that portions of the venturi section 28 adjacent its leading and trailing edges 24, 26 can be inserted initialy and closely within the associated opening of the exhaust outlet port 16 and the tailpipe 14. When such insertion is made, the venturi section 28 is securely mounted between the exaust manifold 12 and the tailpipe 14 by a number of tiebolts 38 inserted through suitably aligned apertures in the exhaust manifold and tailpipe flanges 18 and 20 respectively.

Communication between the exahust manifold and the tailpipe 14 is thus established through throat 40 of the venturi section 28. It will be seen, then, that my conversion system system as thus far described requires little or no additional space for the engine exhaust system. Moreover, my conversion system can be applied to existing vehicles simply by separating the exhaust manifold 12 and the tailpipe 14 a sufficient distance to permit insertion of the venturi section 28. For this purpose, the existing exhaust tailpipe can be appropriately shortened at the inlet muffler clamp. Thus, my conversion system can also be applied to existing vehicles and need not be necessarily instaled by the manufacturer.

In order to induct auxiliary combustion air into the vehicle exhaust system 12–14 in the area of the hottest portion of the nonpulsating effluent, the venturi section 28 is provided with a circumferential array of radial openings 42 which open into the venturi throat 40. In this arrangement, eight such openings are employed although it will be understood that the number can be varied depending upon the size and character of the internal combustion engine. As evident from FIG. 1 of the drawings, the length of the aperture 42 in comparison to their diameter is such that the apertures 42 impart a jetting action to the inducted autxiliary combustion air passing therethrough. This jetting action together with the substantially normal disposition of the apertures 42 relative to the direction of exhaust gas flow 24 causes the inducted air to be thorughly and uniformly mixed with the exhaust gases. When thus mixed and when thus provided with the proper amount of combustion air as determined by the venturi section 28, a substantially complete combustion of the engine exhaust gases results throughtout a wide range of engine operating conditions.

The outward extremities of the induction openings 42 communicate with a circumferentially extending groove 44 formed in this example in the outer periphery of the venturi section 28. The groove 44 together with a closely fitting sleeve 46 form an inlet manifold for the induction apertures 42. The sleeve 46 can be applied to the outer surface of the venturi section 28 in a number of ways. For example, as shown in FIG. 1, the outer surfaces of the venturi section can be machined in the area of its groove 44 and the sleeve 46 having its inner surface similarly machined can be forced thereover as by tapping lightly with a hammer or mallet or other suitable tool. When thus positioned, the sleeve 46 can be secured by spot welds 48. Alternatively, the sleeve 46 can be shrunk-fit upon the venturi section 28, in which case the spot welds 48 will be omitted. In certain applications it may be desirable to seal the sleeve 46 to the adjacent outer surface of the venturi section 28 by seal-welding the lateral edges of the sleeve 46 to the adjacent outer surfaces of the venturi section 28. Obviously, the manifolding groove 44 can be omitted from the venturi section 28 and provided instead on the adjacent inner surface of the sleeve 46.

Air is supplied to the manfolding groove 44 by means of a tapped aperture 50 or the like extending through the sleeve 46 to which a suitable fitted 52 and conduit 54 are secured. The conduit 54 desirably is extended into the slip stream area of the vehicle to ensure the induction of fresh auxiliary combustion air into the venturi section 28 through the manifolding groove 44 and induction apertures 42. Such induction is effected by the reduced pressures in the venturi throat 40 caused by the flow exhaust effluents therethrough. Owing to the elevated temperatures of the exhaust effluents, secondary combustion thereof is immediately initiated adjacent the induction apertures 42. Because of the relatively constant streamline flow of the exhaust effluent in the area of the exhaust manifold outlet 16 and downstream thereof relatively stable flame front is established adjacent the induction apertures 42. The stability of the flame front is further enhanced by the symmetrical array of the apertures 42 and the transverse dispositions thereof, all of which produce uniform and thorough mixing between the exhaust gases and the auxiliary combustion air. If desired, the induction conduit 54 can be disposed as denoted by the chain outline thereof in FIG. 1, so that its inlet portion 56 is directed upstream of the vehicle slip stream, so that the slip stream aids the venturi effect in inducting air through the apertures 42 into the exhaust system, when the vehicle is in motion.

Figure 2:
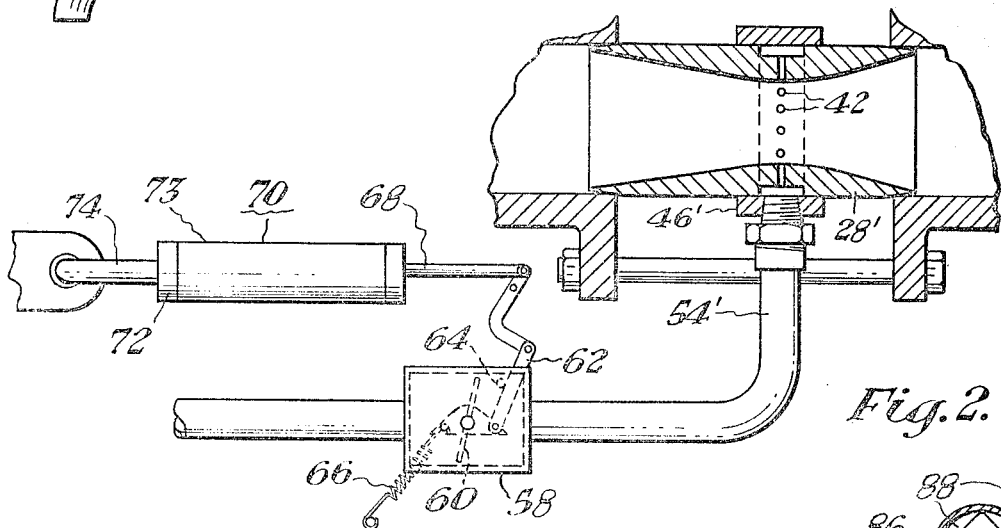
FIG. 2 is a partial longitudinally sectioned view of another form of my conversion system.

During vehicle cruising and acceleration conditions, the suctional effects of the exhaust stream 24 flowing through the venturi section 28 will regulate the amount of auxiliary combustion air required to complete the combustion of exhaust gases, in dependence upon the speed of the engine and the resultant quantity of exhaust gases produced thereby. Under conditions of relatively heavy engine acceleration, however, the proportion of combustible gases in the exhaust effluent increases so that the quantity of auxiliary combustion air provided by the induction effects of the flowing exhaust gases will be insufficient for complete combustion. On the other hand, during engine decelerations when the proportion of combustibles in the exhaust gases decreases, too much auxiliary combustion air may be inducted. Accordingly, a modified form of my conversion system is shown in FIG. 2 of the drawings for providing additional control of auxiliary combustion to meet these situations. In the latter arrangement of my invention, the venturi section 28′ and sleeve 46′ are coupled to an air induction conduit 54′ in which is mounted a throttle valve 58. The valve 58 can be provided in a variety of forms, a desirable form of which is a butterfly valve having vane 60 and operating lever 62. A stop 64 desirably is provided within the casing for engagement by the lever 62 to prevent fully closing the valve. The vane 60 desirably is biased toward its partially closed position, as shown in FIG. 2 by means of spring 66.

The lever 62 in this example is operated by a cable 68 or the like which in turn is moved by fluid motor 70, comprising for example the piston 72 and cylinder 73. The position of piston 72 is controlled by the depression in the intake manifold of the engine to which the piston and cylinder is coupled by conduit 74. Accordingly, when the engine is at or near idling conditions the maximum manifold depression draws the lever 62 via cable 68 against stop 64 so that only a small amount of auxiliary combustion air can be drawn into the venturi apertures 42. On the other hand, decreasing manifold depression with increasing acceleration permits the spring 66 to draw lever 62 in the opposite direction toward the full open position of the valve 58. With this arrangement the maximum available air through the conduit 54′ is varied in proportion to the load upon the associated engine. Thus, the venturi section 28′ and associated components are designed to supply adequate auxiliary combustion air under maximum or near maximum engine load conditions. For decreasing load conditions the valve 58 will be increasingly moved toward its closed position by the fluid motor 70, and this movement will vary with both the speed and accelerating conditions of the engine as reflected by the intake manifold depression. Thus, the amount of auxiliary combustion air inducted by the venturi section 28′ will be related both to the speed of the engine and to the engine acceleration and deceleration. It is to be understood, of course, that the valve lever 62 can be manually operated by suitable linkage extending to and mounted on the vehicle dash or it can be coupled to the throttle linkage of the engine carburetor (not shown) for simultaneous action therewith so that the carburetor throttle plate (not shown) and the valve member 60 will be moved simultaneously toward their opened and closed positions. The arrangement of my invention as shown in FIGS. 1 and 2 are satisfactory for almost all vehicle operating conditions. However, when the vehicle is stationary with the engine idling, the velocity of exhaust gases through the venturi section is usually not sufficient to induce the venturi effect. Accordingly, the exhaust gases may pass outwardly through the venturi apertures 42 rather than drawing auxiliary combustion air into the throat 40 of the venturi section 28 or 28′. It is desirable therefore to elongate the induction conduit 54 such that its outer or intake end is positioned as far as practical from the cab or passenger compartment of the vehicle.

Figure 4:
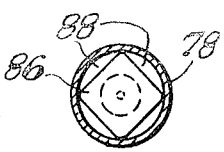
FIG. 4 is a cross-sectional view of the apparatus as shown in FIG. 3 and taken along reference line IV—IV thereof.
Figure 3:
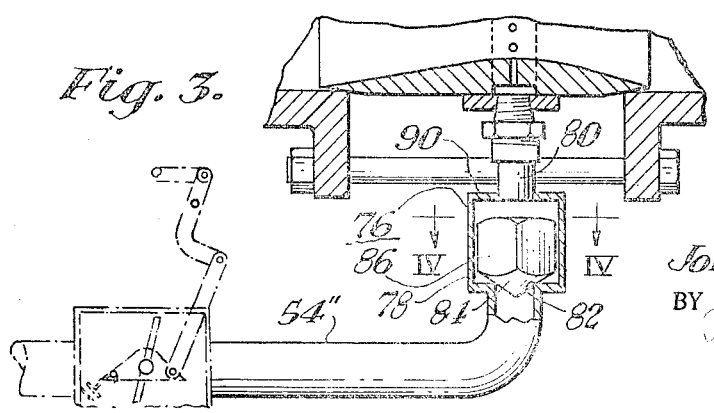
FIG. 3 is a longitudinally sectioned view of still another form of my conversion system.

However, elongation of the induction conduit 54 or 54′ can be avoided with the arrangement of my conversion system as shown in FIGS. 3 and 4 of the drawings. In the latter arrangement of my invention the induction conduit 54″ need be provided only with sufficient length to reach the nearest slip stream area of the vehicle. To prevent the outflow of exhaust gases therethrough, a check valve 76 of simple and rugged construction is positioned in the conduit 54″ and is directed so that the induction of auxiliary combustion air opens the check valve.

In this arrangement, the check valve 76 includes a generally circular valve casing 78 mounted desirably in a vertical section 80 of the induction conduit 54″. An annular valve seat member 82 is mounted in the bottom of the casing 78 as viewed in FIG. 3 for cooperation with a conical seating surface 80 machined on the lower end portion of plunger 86. The remainder of plunger 86, as better shown in FIG. 4 is of regular polygonal configuration, for example square, to provide longitudinal passages 88 between the flat sides of the plunger 86 and the encircling wall of the valve casing 78. Alternatively, the valve casing 78 can be of a regular polygonal configuration while the preponderant portion of plunger 86 can be of cylindrical configuration, for example, to provide the aforementioned air passages. The related interior dimensions of the casing 78 in any event are made slightly larger than the diametric or diagonal dimension of the plunger to provide a guide therefor without binding.

Upward movement of the plunger 86 is limited by the annular top wall 90 of the casing 78. Desirably, the plunger 86 is fabricated from a lightweight material so as not to interfere unduly with the inducted auxiliary combustion air through the conduit 54″. On the other hand, the vertical mounting of the check valve 76 assures closing of the check valve during engine idle, inasmuch as both the weight of the plunger 86 and the pressure of any outflow of exhaust gases through the apertures 42 operate to close the check valve 76. A throttling valve such as the valve 58′ and associated components, as indicated by the chain outline thereof in FIG. 3, can optionally be provided in the induction conduit 54″, depending upon the specific application of the invention.

With reference now to FIG. 5 of the drawings, I have discovered that optimum operation of the venturi structure such as that shown in FIGS. 1–3 of the drawings results from the use of particular surface configurations and/or of dimensions and relationships falling within certain critical ranges. Thus, I have found, for optimum combustion air induction and maximum exhaust gas combustion over the widest variation in engine speeds that the entrance or leading angle 100 of the venturi section 28′ should vary between 45–65° with an angle of 60° being optimum within this range. Likewise, the angle of the trailing edges 102 of the venturi structure 28′ may vary between 3½° and 7°. The combustion air inlet apertures 42′ desirably are located within the throat area 104, i.e., at the narrowest portion or vena contracta of the passage through the venturi. For optimum results the throat area 104 desirably is flat (i.e. cylindrical), in contrast to the remaining inner venturi surfaces 104, 106 which are of convex curvatures. Desirably also the apertures 42′ are disposed adjacent the median or mid-point of the flat throat area 104 as denoted by chain reference line 108 in FIG. 5. Finally, I have determined that the operational characteristics of the venturi 28′ are further enhanced when the axial lengths of the convex inner surface sections 104, 106 are in a ratio of about 1:4.5 to 1:6.

In the venturi structure 28″ of FIG. 5A, additional means are provided for more thoroughly mixing the exhaust gases flowing through the venturi 28″ as denoted by arrow 110 with inducted combustion air flowing into the venturi throat area 104′ as denoted by flow arrow 112. In this arrangement, some or all of the venturi apertures 42″ are provided with a hood 114 comprising, in this example, a relatively short, truncated section of cylindrical conduit. I have further found that the mixing induced by the use of the hoods 114 is optimized when the truncating angle α, relative to the flat (cylindrical) throat surface 104′, is between 25°–35° and preferably about 30°.

In FIG. 6 of the drawings exhaust duct 15′, including in this example tailpipe 14′ intermediate duct section 17 and manifold port 16′ is provided with a pair of series-mounted venturi sections 116, 118, each of which has a manifold structure 44' and induction apertures 42'. The venturi sections 116, 118 are spaced along the length of the exhaust duct 15' and in general are disposed at the same general location with reference to the exhaust manifold 12 (FIG. 1). With the exhaust gases flowing through the duct 15' in the direction denoted by flow arrow 24', the apertures 42' of the first venturi section 116 are sized to emit a portion of the total requirement in combustion air. This results in a partial combustion and preheating of the exhaust gases and in consequence the combustion is carried more nearly to completion adjacent the second venturi section 118. Desirably, the venturi sections 116, 118 are spaced such that maximum temperature of the combusting gases is achieved. In the example shown, the venturi sections 116, 118 desirably are spaced a distance equivalent to about the length of one venturi section.

In FIG. 7 of the drawings, inner and outer venturi sections 120, 122 respectively are arranged in series-parallel within the exhaust duct 15', which in this example is similar to the FIG. 1 arrangement save for tapered connecting flanges 18'', 20''. The inner venturi 120 is suspended from manifold section 124 by means of a number of relatively short, rigid conduits 126, through which combustion air is inducted. The conduits 126 connect venturi apertures 128 with manifold passage 130.

In this example, four such conduit sections 126 are utilized with a corresponding number of larger epertures 128 (in comparison with preceding figures). The apertures 128 in this example are nearly equal in diameter to the width of the venturi throat or flat section 104'. The construction of the inner venturi 120 otherwise is similar to that of FIG. 5.

The outer venturi 122 likewise is provided with a shape generally similar to that shown in FIG. 5, with the exception that the throat apertures can be omitted in this example. The outer venturi 122 thus functions to enhance the mixing of air inducted by the inner venturi 120 with exhaust gases flowing respectively through the inner and outer venturi sections 120, 122 as denoted by flow arrows 132, 134. In furtherance of this purpose, the trailing edge 102' of the inner venturi 120 desirably terminates adjacent the outer venturi throat section 104'' as shown in FIG. 7. The arrangement of FIG. 7 therefore results in a higher combustion temperature and a more nearly complete combustion of the exhaust gases.

As better shown in FIG. 8 of the drawings, the inner and outer venturi structures 120', 122' can be mounted in parallel fashion within the exhaust duct 15', particularly where space limitations are a consideration. In this arrangement, the inner venturi structure 120' is positioned entirely within the outer venturi structure 122' such that the throat sections 104', 104'' of the venturi sections 120', 122' are transversely aligned. With the arrangement of FIG. 8, the trailing edge 102' of the inner venturi 120' is recessed well within outer venturi 122' to provide a significant improvement in the mixing and combustion characteristics of the FIG. 8 arrangement in comparison with use of a single venturi structure such as illustrated in FIGS. 1–5 of the drawings.

The mixing, combustion, and temperature characteristics of my novel anti-pollution device are enhanced still further with the use of a third section 136, as shown in FIG. 9 of the drawings. In this arrangement, the venturi sections 136, 120'', 122'' are arranged in series-parallel within the exhaust duct 15', with the intermediate and outer venturi structures 120'', 122'' being supported in somewhat the same manner as described in connection with FIG. 7 of the drawings. In this example, the inmost venturi section 136 is suspended independently from a separate manifold structure 138 disposed adjacent the intermediate venturi manifold structure 124'. A number of rigid conduit sections 140 of suitable length are joined to the manifold structure 138 and the inmost venturi section 136 to suspend the latter substantially, co-axially of the exhaust duct 15'. By way of example, four throat apertures 128' and four suspending conduits 140' are utilized. The apertures 128' can be similarly disposed relative to the throat section 104''' of the inmost venturi 136.

For optimum mixing characteristics at the first venturi stage 136, the suspending conduit sections 140 are extended through the inmost venturi section 136 where they are truncated as denoted by reference characters 114' in order to form aperture hood structures such as described in connection with FIG. 5A. The trailing edge 102'' of the inmost venturi 136 is terminated adjacent the midpoint of the intermediate venturi throat section 104' to enhance the mixing of the gases flowing through the first venturi stage (arrow 142) with gases flowing through the second venturi stage 120'' (arrow 144) and with the second stage combustion air (arrow 146).

As described previously in connection with FIG. 7, the intermediate venturi stage 120'' likewise is terminated adjacent the throat section 104'' of the outer venturi stage 122'' to promote mixing of exhaust gases flowing around the inmost and intermediate venturi stages 136, 120'' (flow arrows 134') with the exhaust gases and combustion air flowing through the inmost and intermediate venturi stages (arrow 132').

This stagewise combustion air induction, coupled with stagewise mixing and combustion of the exhaust gases has been found to yield a maximum or nearly perfect combustion of the exhaust gases.

Referring now to FIGS. 10 and 10A of the drawings, a parallel or transversely aligned arrangement of the venturi sections 136', 120''' and 122''' is illustrated. The arrangement of FIGS. 10, 10A is particularly advantageous in the presence of severe space limitations. In this arrangement, a single manifold structure 146 is employed, and the rigid conduit sections 140' are secured to the manifold 146 in communication with its manifolding passage 148 and extend through the outer and intermediate venturi sections or stages 122''', 120'''. The conduit sections 140' therefore support both the inmost venturi section 136' and intermediate venturi section 120''' co-axially within the outer venturi section 122'''. In this connection, the conduit sections 140' are rigidly joined to the venturi structures 136', 120''' and terminate, in this example, at their inward ends in the truncated aperture hoods 114'.

In the arrangement of FIGS. 10, 10A combustion air is supplied only to the inmost venturi 136', the throat apertures 128' of which are appropriately sized. Alternatively smaller apertures (not shown) can be extended through the supporting conduits 140' at points adjacent the throat surface of the intermediate venturi 120'''. From the temperature of the resulting combustion the intermediate venturi 120''' will become sufficiently hot to form a glow type ignition device to facilitate further combustion of the exhaust gases. The intermediate and outer venturis 120''', 122''' enhance the mixing characteristics of the gases passing repectively therethrough (flow arrows 132', 134') with the preliminarily combusting gases from the inmost venturi 136' (flow arrow 142').

The combustion air manifold 146 and associated venturi components are joined to complementarily shaped flanges 18'', 20'' (secured to the exhaust duct 15') by means of a plurality of tie bolts 152. The venturi structures of FIGS. 7, 8 and 9 can be mounted by similar flanges and tie bolts. The series venturi sections 116, 118 of FIG. 6 can be mounted as illustrated either in FIGS. 1–3 or FIG. 10. The series-parallel and parallel venturi arrangements of FIGS. 7–10, it is contemplated that combustion air can be inducted also directly through the outermost venturi sections 122, 122', etc.

I have found that the inmost venturi section 136 of FIG. 9 or 136' of FIG. 10 is most effective at low engine speeds, and particularly at idling speeds. This is true to a somewhat lesser extent as to the inner venturi sections 120 (FIG. 7) or 120' (FIG. 8) of the two-stage parallel or series-parallel venturi induction systems. The efficacy of the inmost or intermediate venturis is enhanced still further at idling speeds with the use of the aperture hoods 114 (FIG. 5A) or 114' (FIG. 9). Thus, with the arrangements of my invention as shown in FIGS. 7–10, it is usually unnecessary to employ the check valve arrangement of FIGS. 3 and 4 of the drawings.

From the foregoing it will be apparent that novel and efficient exhaust conversion systems have been disclosed herein which largely eliminate the pollutants exhausted to the atmosphere. With my arrangement the carbon monoxide and other harmful, combustible substances such as hydrocarbons are substantially fully converted into relatively harmless carbon dioxide and water vapor. My conversion system is applicable to gasoline, diesel and other internal combustion engines. For example, a venturi section such as venturi section 28 can be mounted in the thrust nozzle of a jet engine. Such arrangement not only will ensure the complete combustion of the jet fuel but also will provide additional thrust.

I have found, upon application of my conversion system, to the exhaust system of a diesel-powered truck, for example, that the usually dense, smoky exhaust which is characteristic of an operating diesel engine is almost entirely eliminated. Even under conditions of maximum load, only a relatively thin brown smoke is emitted from the exhaust instead of the usual dense black smoke. In this same connection, a smoky orange flame has been observed emanating 6 to 8 inches from the diesel exhaust outlet before installation of my conversion system. After installation only a barely visible dull red glow is apparent.

While I have shown and described certain presently preferred embodiments of the invention and have illustrated presently preferred methods of practicing the same, it is to be distinctly understood that the invention is not limited thereto but may be otherwise variously embodied and practiced within the spirit and scope of the invention.

I claim:

1. A conversion system for an exhaust duct or the like through which partially combusted gases are circulated, said system comprising at least one venturi induction section mounted in the exhaust duct, said venturi section being disposed adjacent that portion of said duct wherein said exhaust gases exhibit substantially a maximum temperature and a nonpulsating flow, said venturi section having a circumferential array of radially extending apertures for inducting combustion air into said duct upon passage of said exhaust gases therethrough, and a hood structure at least partially surrounding at least some of said venturi apertures to promote mixing of the exhaust gases with the inducted combustion air, said venturi section being spacedly suspended within said exhaust duct by rigid conduit sections joined to said venturi section and to said exhaust duct in communication with said apertures and with a source of said combustion air, said conduit sections being extended through said venturi section to define said apertures and to form said hood structures.

2. A conversion system for an exhaust duct or the like through which partially combusted gases are circulated, said system comprising at least one venturi induction section mounted in the exhaust duct, said venturi section being disposed adjacent that portion of said duct wherein said exhaust gases exhibit substantially a maximum temperature and a non-pulsating flow, said venturi section having a circumferential array of radially extending apertures for inducting combustion air into said duct upon passage of said exhaust gases therethrough, said venturi section being provided with a relatively narrow and substantially cylindrical throat area disposed substantially closer to a leading edge than to a trailing edge of said venturi section and flushly engaging adjacent surfaces of said venturi section, said apertures being extended through said cylindrical area, said cylindrical area being disposed substantially within the vena contracta of said venturi section.

3. The combination according to claim 2 wherein the inner surfaces of said venturi section on either side of said cylindrical area are of convex configuration in longitudinal cross section.

4. The combination according to claim 3 wherein the angles of the leading and trailing edges respectively of said venturi section fall within the ranges of 50–65° and 3½ to 7° respectively.

5. The combination according to claim 2 wherein the length ratios of the inside venturi surface on either side of said cylindrical surface respectively fall within a ratio range of 1:4.5 to 1:6.

6. A conversion system for an exhaust duct or the like through which partially combusted gases are circulated, said system comprising a venturi induction section mounted in the exhaust duct, said venturi section being disposed adjacent an inlet of said duct wherein said exhaust gases exhibit substantially a maximum temperature and in a substantially straight line portion of said duct wherein said gases exhibit a substantially nonpulsating flow, said venturi section being supported generally between a pair of exhaust duct portions and having a circumferential array of radially extending apertures for inducting ambient combustion air into said duct upon passage of said exhaust gases therethrough, said venturi section including a plurality of venturi elements mounted generally in coaxially parallel interfitting fashion within said exhaust duct, and means for conducting combustion air through said section to the throat area of at least the innermost one of said venturi elements.

7. The combination according to claim 6 wherein said venturi sections are disposed such that their respective throat areas are in substantial transverse alignment.

8. The combination according to claim 7 wherein an innermost one of said venturi sections is enclosed completely within an outer venturi section.

9. The combination according to claim 6 wherein at least one venturi section is disposed in a series parallel array with an outwardly adjacent venturi section such that a trailing edge of said one section is disposed adjacent a throat area of said adjacent section.

10. The combination according to claim 6 wherein at least three venturi sections are disposed generally in coaxially paralled interfitting fashion in said exhaust duct means are provided for supplying air to an innermost one of said venturi sections, and an intermediate one of said venturi sections is disposed for heating by combusting exhaust gases to provide glow ignition means for stabilizing the combustion of said gases.

11. The combination according to claim 6 wherein a hood structure at least partially surrounds at least some of the induction apertures of an inner one of said venturi structures to promote mixing of inducted combustion air and exhaust gases flowing therethrough.

12. The combination according to claim 6 wherein at least two of said venturi sections are mounted in a parallel-series array, the trailing edge of an inner venturi section terminating adjacent a throat area of an adjacently outer venturi section.

13. A conversion system for an exhaust duct or the like through which partially combusted gases are circulated, said system comprising at least three venturi sections mounted in the exhaust duct, said venturi sections being disposed adjacent that portion of said duct wherein said exhaust gases exhibit substantially a maximum temperature and a nonpulsating flow, at least one of said venturi sections having a circumferential array of radially extending apertures for inducting combustion air into said duct upon passage of said exhaust gases therethrough, said venturi sections being mounted generally in parallel fashion within said exhaust duct, at least three of said venturi sections being mounted in a parallel-series array, means for supplying combustion air to the throat areas of at least the innermost and an intermidate one of said venturi sections, and the trailing edges of at least said innermost and said intermediate venturi sections terminating respectively adjacent throat areas of succeeding venturi sections.

14. A conversion system for an exhaust duct or the like through which partially combusted gases are circulated, said system comprising a venturi induction section mounted in the exhaust duct, said venturi section being disposed adjacent an inlet of said duct wherein said exhaust gases exhibit substantially a maximum temperature and in a substantially straight line portion of said duct wherein said gases exhibit a substantially nonpulsating flow, said venturi section being supported generally between a pair of exhaust duct portions and having a circumferential array of radially extending apertures for inducting ambient combustion air into said duct upon passage of said exhaust gases therethrough and manifolding means mounted on said venturi section and including means for connecting each of said venturi apertures to said manifolding means to supply said air to said apertures, said venturi section including a venturi element supported within said exhaust duct by said connecting means.

15. A conversion system for an exhaust duct or the like through which partially combusted gases are circulated, said system comprising at least one venturi induction section mounted in the exhaust duct, said venturi section being disposed adjacent that portion of said duct wherein said exhaust gases exhibit substantially a maximum temperature and a nonpulsating flow, said venturi section having a circumferential array of radially extending apertures for inducting combustion air into said duct upon passage of said exhaust gases therethrough, and a hood structure at least partially surrounding at least some of said venturi apertures to promote mixing of the exhaust gases with the inducted combustion air, the inward edges of said hood structure being truncated at an angle to the axis of said venturi section.

16. The combination according to claim 15 wherein said truncating angle is within the range of 25 to 30 degrees.

References Cited

UNITED STATES PATENTS

| 2,493,387 | 1/1950 | Campbell | 230—95 |
| 2,585,495 | 2/1952 | Phillips. | |
| 2,677,231 | 5/1954 | Cornelius | 60—30 |
| 2,711,284 | 6/1955 | Phillips | 230—104 |
| 2,772,147 | 11/1956 | Bowen | 60—30 |
| 2,851,852 | 9/1958 | Cornelius | 60—30 |
| 3,032,969 | 5/1962 | Barnes. | |
| 3,166,895 | 1/1965 | Slayter | 60—30 |
| 3,300,964 | 1/1967 | Knopp. | |

FOREIGN PATENTS 933,502  1/1948  France.

DOUGLAS HART, Primary Examiner

U.S. Cl. X.R.

230—95, 103, 104